(12) United States Patent
Simofi-Ilyes et al.

(10) Patent No.: US 7,839,038 B2
(45) Date of Patent: Nov. 23, 2010

(54) ELECTRIC MOTOR CASE WITH FOLDED OUT MOUNTING TABS AND ECONOMICAL MOTOR-FAN MODULE PACKAGING

(75) Inventors: Attila Simofi-Ilyes, London (CA); Stefan Zenon Smorowski, London (CA); Andrew Lakerdas, London (CA); Paul Stephen McLennan, London (CA); Ovidius Turcanu, London (CA)

(73) Assignee: Brose Fahrzeugteile GmbH & Co. Kommanditgesellschaft, Würzburg, Würzburg (DE)

( * ) Notice: Subject to any disclaimer, the term of this patent is extended or adjusted under 35 U.S.C. 154(b) by 0 days.

(21) Appl. No.: 12/714,584

(22) Filed: Mar. 1, 2010

(65) Prior Publication Data
US 2010/0146769 A1    Jun. 17, 2010

Related U.S. Application Data

(62) Division of application No. 11/407,933, filed on Apr. 21, 2006, now abandoned.

(60) Provisional application No. 60/702,473, filed on Jul. 26, 2005.

(51) Int. Cl.
*H02K 5/04* (2006.01)
*H02K 15/14* (2006.01)
*H02K 9/06* (2006.01)

(52) U.S. Cl. .................... 310/89; 310/402

(58) Field of Classification Search .............. 310/89, 310/154.01, 254.1, 402, 403, 40 MM; 29/596; 417/366, 423.14, 423.15; 248/561, 562
See application file for complete search history.

(56) References Cited

U.S. PATENT DOCUMENTS

| 2,678,245 | A |   | 5/1954  | Kirsch |
|-----------|---|---|---------|--------|
| 5,772,176 | A | * | 6/1998  | Keck et al. ............ 248/638 |
| 5,914,550 | A | * | 6/1999  | Periyathamby et al. ...... 310/91 |
| 6,032,727 | A | * | 3/2000  | Martins ............... 165/149 |
| 6,155,335 | A | * | 12/2000 | Acre et al. ............ 165/41 |
| 6,161,274 | A | * | 12/2000 | Stark et al. ............ 29/596 |

(Continued)

FOREIGN PATENT DOCUMENTS

EP    780277 A2    6/1997
JP    10339292 A   12/1998

*Primary Examiner*—Quyen Leung
*Assistant Examiner*—David W. Scheuermann
(74) *Attorney, Agent, or Firm*—Manelli Denison & Selter PLLC; Edward J. Stemberger (57) ABSTRACT

A cooling module 67 includes a motor assembly 42 having a motor case 24 having at least one open end and including mounting brackets 30 integral therewith. Each bracket has only a bottom portion 32 connected with the motor case. An armature assembly is disposed in the motor case and includes a rotatable shaft 46. A brush card assembly 56 is associated with the armature assembly, and an end cap 60 is disposed over the brush card assembly and partially covers the open end of the motor case and thereby defining a non end cap covered motor portion 63. A fan 64 is coupled to an end of the shaft and has a hub substantially covering one end of the motor assembly. A shroud 74 has a motor cover 76. Fastening structure 78 is associated with the shroud and engaged with the brackets thereby mounting the motor assembly to the shroud, with the motor cover substantially covering the end cap and the non end cap covered motor portion.

4 Claims, 7 Drawing Sheets

U.S. PATENT DOCUMENTS

| | | | |
|---|---|---|---|
| 6,755,157 B1* | 6/2004 | Stevens et al. | 123/41.49 |
| 6,899,516 B2* | 5/2005 | Wang | 415/60 |
| 2003/0026699 A1* | 2/2003 | Stairs et al. | 416/192 |
| 2006/0202578 A1* | 9/2006 | Pricope et al. | 310/91 |
| 2006/0239838 A1* | 10/2006 | Rahbar et al. | 417/354 |
| 2007/0024135 A1* | 2/2007 | Simofi-Ilyes et al. | 310/89 |
| 2008/0201928 A1* | 8/2008 | Simofi-Ilyes et al. | 29/402.03 |
| 2008/0224562 A1* | 9/2008 | Qin et al. | 310/216 |

* cited by examiner

ELECTRIC MOTOR CASE WITH FOLDED OUT MOUNTING TABS AND ECONOMICAL MOTOR-FAN MODULE PACKAGING

This application is a division of U.S. application Ser. No. 11/407,933, filed on Apr. 21, 2006 now abandoned and claims the benefit of the earlier filing date of U.S. Provisional Application No. 60/702,473, filed on Jul. 26, 2005, which is incorporated by reference herein in its entirety.

FIELD OF THE INVENTION

This invention relates to Permanent Magnet Direct Current (PMDC) motors for automotive applications such as engine cooling.

BACKGROUND OF THE INVENTION

Electric motors used in engine cooling applications need some type of mounting feature on the end cap or motor case (stator assembly) to provide adequate fastening to a shroud. The stator assembly is the stationary member of the electric motor. The two most commonly used features are shown FIG. 1 and FIG. 2.

Figure 1:
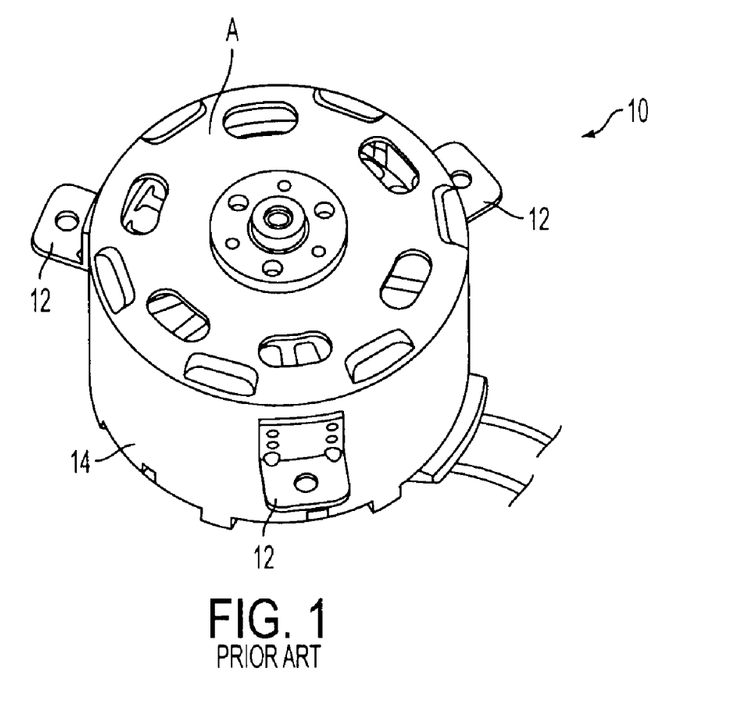
FIG. 1 is a view of a conventional electric motor assembly where the motor mounting features for mounting a shroud are welded to the motor case.

FIG. 1 shows an electric motor 10 where the motor mounting features (to shroud) are conventional brackets 12 welded to the motor case/stator assembly 14. An end cap (not shown) of the motor is at the opposite side to the fan side A. With this configuration, the function of the end cap is to provide coverage to the motor at the opposite side of the fan and to hold a bearing/bushing assembly (not shown) for supporting a motor shaft. However, the end cap does not have structural function with regard to the motor mounting to the shroud.

Figure 2:
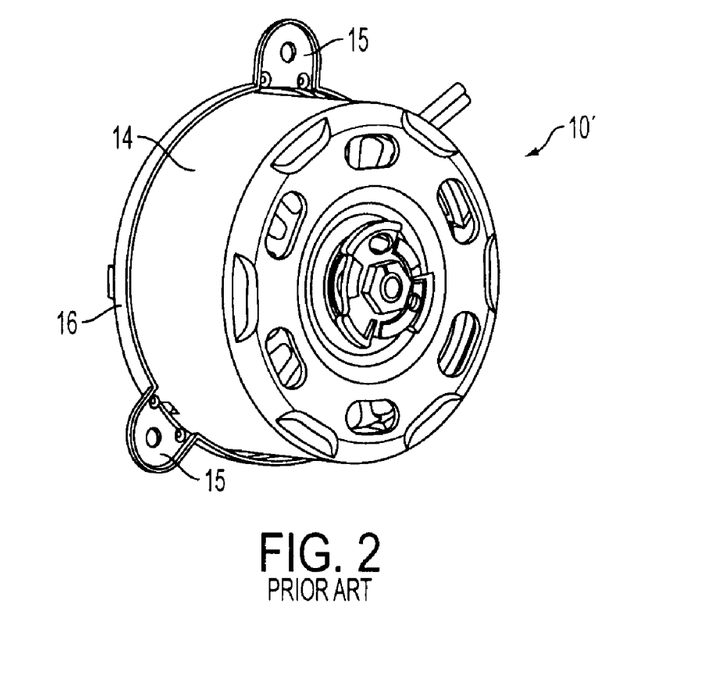
FIG. 2 is a view of a conventional electric motor assembly where the motor mounting features for mounting a shroud are integrated into the end cap.

FIG. 2 shows another electric motor 10' that is functionally the same as the motor 10 of FIG. 1. However, in FIG. 2, the conventional mounting features to mount the motor 10' to the shroud are flanges 15 integrated with the end cap 16 that covers an end of the motor case/stator assembly 14.

Figure 3:
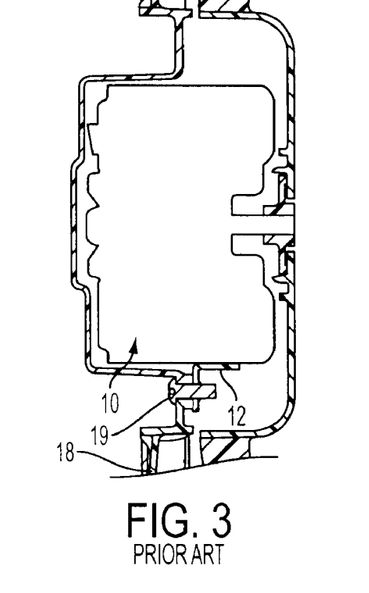
FIG. 3 is a sectional view of the conventional motor of FIG. 1 shown mounted to a shroud.
Figure 4:
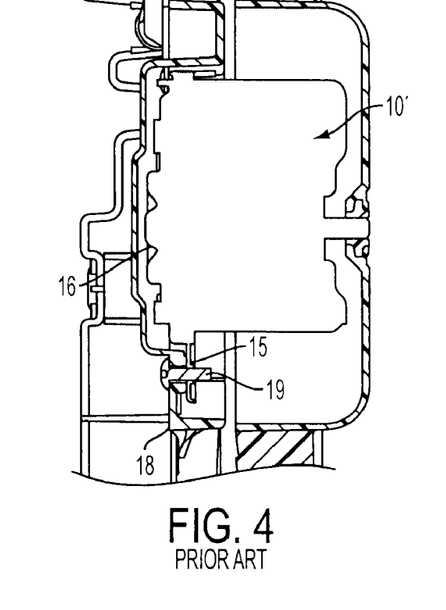
FIG. 4 is a sectional view of the conventional motor of FIG. 2 shown mounted to a shroud.

Conventional motor to shroud attachments are illustrated in FIG. 3 and FIG. 4. FIG. 3 shows the motor 10 to shroud 18 connection for motor 10 of FIG. 1. FIG. 4 shows the motor 10' to shroud 18 connection for motor 10' of FIG. 2. In both configurations, the fastening method is done with a screw fastener 19 or rivet. A conventional fan 22 is driven by the associated motor 10, 10'.

The welded brackets 12 of motor 10 increase the overall cost of the system due to the cost of three brackets and the cost of a welding operation. The flanges 15 on the end cap of motor 10' increase the overall system cost due to the cost of a larger and thicker piece of material used to make the end cap having the flanges.

Since there is a high demand to reduce the system cost of the engine cooling module, there is a need to reduce the cost of the attachment mechanism of a motor to a shroud.

SUMMARY OF THE INVENTION

An object of the present invention is to fulfill the need referred to above. In accordance with the principles of the present invention, this objective is obtained by providing a cooling module including a motor assembly having a motor case defining a stator of generally cylindrical shape having at least one open end. The motor case includes a plurality of mounting brackets integral therewith at the open end. Each mounting bracket has only a bottom portion connected with the motor case with side portions of each bracket being separated from the motor case by cut-out portions in the motor case. An armature assembly is disposed in the motor case for rotation with respect to the motor case. The armature assembly includes a shaft that rotates therewith. A brush card assembly is associated with the armature assembly. An end cap is disposed over the brush card assembly and partially covers the open end of the motor case, thereby defining a non end cap covered motor portion. A fan is coupled to an end of the shaft and has a hub substantially covering one end of the motor assembly. A shroud has a motor cover. Fastening structure is associated with the shroud and engaged with the brackets thereby mounting the motor assembly to the shroud, with the motor cover substantially covering the end cap and the non end cap covered motor portion.

In accordance with another aspect of the invention, a stator is provided for a permanent magnet DC motor. The stator includes a motor case of generally cylindrical shape having at least one open end. The case includes a plurality of mounting brackets integral therewith at the open end. Each mounting bracket has only a bottom portion connected with the motor case with side portions of each bracket being separated from the motor case by cut-out portions in the motor case. Each mounting bracket is folded-out about the bottom portion thereof with respect to the motor case for use in mounting the motor case to a shroud.

In accordance with yet another aspect of the invention, a method of mounting a motor assembly to a shroud provides a motor assembly having a motor case of generally cylindrical shape having at least one open end. An end cap partially covers the open end. The motor case defines a central axis and includes a plurality of mounting brackets integral therewith at the open end. Each mounting bracket has only a bottom portion connected with the case with side portions of each bracket being separated from the motor case by cut-out portions in the motor case. The mounting brackets are bent about the bottom portion thereof with respect to the motor case so as to be generally transverse with respect to the central axis. A shroud is provided having a motor cover. The motor case, and thus the motor assembly, is mounted to the shroud by engaging a fastener, associated with the motor cover, with each of the brackets such that the motor cover substantially covers the end cap and open end of the motor case.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

The invention will be better understood from the following detailed description of the preferred embodiments thereof, taken in conjunction with the accompanying drawings, wherein like reference numerals refer to like parts, in which.

DETAILED DESCRIPTION OF THE EXEMPLARY EMBODIMENTS

Figure 5:
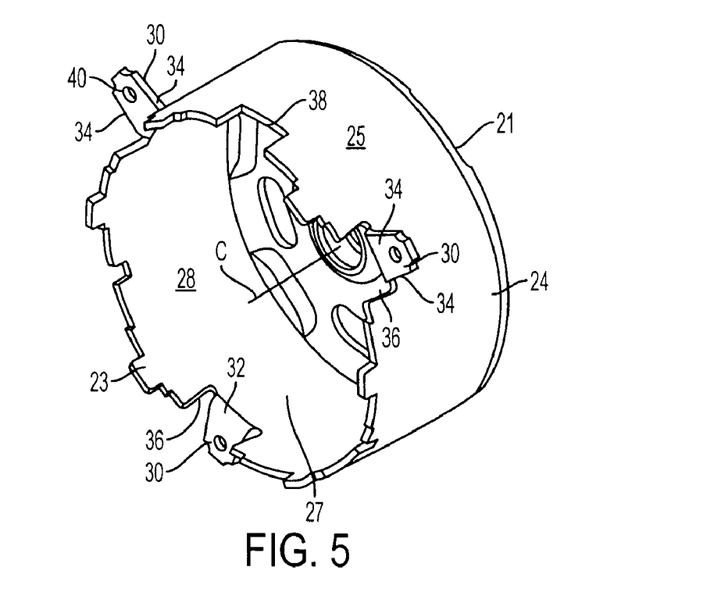
FIG. 5 is a perspective view of a motor case having folded-out mounting tabs in accordance with the invention.
Figure 6:
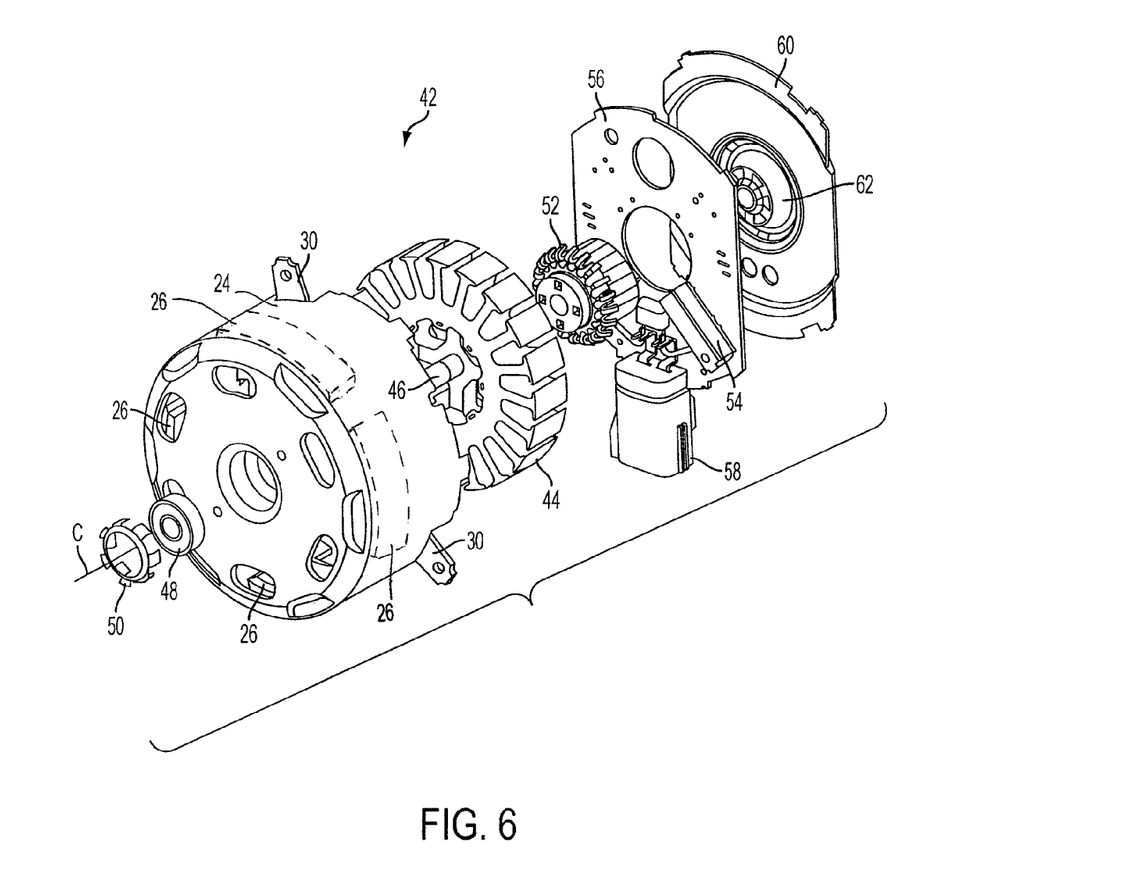
FIG. 6 is an exploded view of a motor assembly using the motor case of FIG. 5.

With reference to FIG. 5, a motor case 24 is shown in accordance with the principles of the present invention, for use in a PMDC motor. The motor case 24 has a generally cylindrical wall 25, preferably a closed end 21, and an opposing open end 23, defining an interior 27. With reference to FIG. 6, permanent magnet structure 26 is mounted to the inside surface 28 of wall 25 within the interior 27. In the embodiment, the magnet structure 26 includes four permanent magnets (only two are seen in FIG. 6), although one or more magnets can be provided. This assembly defines a stator assembly of a PMDC motor that receives a conventional armature assembly (not shown in FIG. 5). The stator assembly is the stationary member of the motor.

As shown in FIG. 5, the motor case 24 includes a plurality (e.g., at least two) of folded out tabs or brackets 30 provided in accordance with the principles of the invention for mounting the motor case 24 to a shroud. The brackets 30 are made integral with the wall 25 of the motor case 24 at the open end 23 thereof, with only a bottom portion 32 of the bracket 30 being connected with the motor case 24. Thus, the brackets 30, in an unfolded condition, define part of the cylindrical wall 25 of the motor case 24 with sides 34 of the brackets 30 being separated from the motor case 24 by cutout portions 36 in the motor case 24. Thus, the brackets 30 use existing material of the motor case. A cutout 38 is provided in the motor case 24 for receiving a connector so as to reduce the overall axial length of the motor. The motor case 24 defines a central axis C of a motor assembly 42 (FIG. 6).

The brackets 30 are folded out (bent) about the bottom portion 32 to extend from the motor case 24 (e.g., generally transverse with respect to the central axis C) so as to provide optimum structural support with minimum magnetic flux loss in the motor. Each bracket 30 includes fastener engagement structure preferably in the form of a through hole 40 receiving a fastener, for securing the motor case 24 to a shroud, as will be explained more fully below.

The preferred radial position (with respect to the central axis C) for each bracket 30 is at the edge of the magnetic flux circuit. This position typically would be at middle of a magnet 26 that is mounted to the inside of the motor case 24 as best shown in FIG. 6. In the embodiment, since three evenly spaced brackets 30 are provided for a four-pole (four permanent magnets 26) motor, only two brackets 30 are disposed with respect to the middle of an associated magnet 26. It can be appreciated that the three brackets 30 can be unevenly spaced so to that each bracket 30 can be disposed with respect to a middle of an associated magnet 26. Also, four brackets 30 can be provided and disposed with respect to a middle of an associated magnet of the four-pole motor. The folded-out bracketing can be applied to motors having other than four poles.

Figure 7:
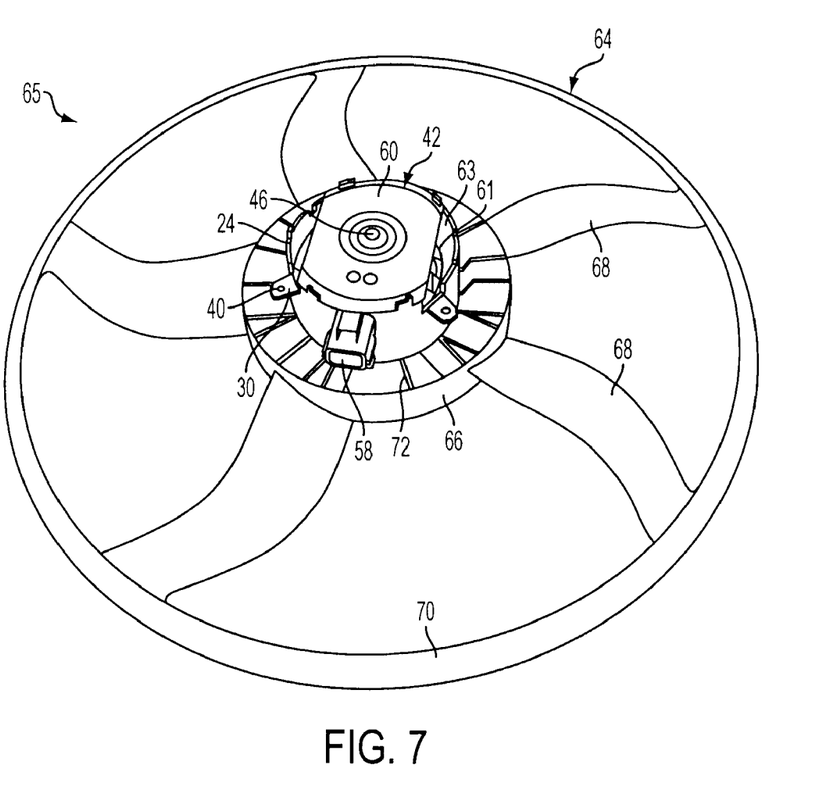
FIG. 7 is a view of a fan mounted onto a shaft of the motor of FIG. 6.

FIG. 6 is an exploded view of a permanent magnet DC brush motor assembly, generally indicated at 42, using the motor case 24 of FIG. 5 with folded out brackets 30. The motor assembly 42 includes an armature assembly having a lamination stack 44 (armature windings 61 shown in FIG. 7) for rotating a shaft 46. A bearing 48 supports an end of the shaft 46 for rotation and a bearing retainer 50 holds the bearing 48 in the motor case 24. A commutator 52 of the armature assembly is associated with the armature stack 44 for delivering electric current from brushes 54 of a brush card 56 to the armature windings in the conventional manner. The link windings of the commutator 52 are not shown but are the type disclosed in U.S. Pat. No. 6,694,599, the contents of which is hereby incorporated by reference into this specification. A connector 58 for powering the motor assembly 42 is mounted to the brush card 56 so current can be supplied to the brushes 54. A portion of the connector 58 is received in the cutout 38 (FIG. 5) of the motor case 24. An end cap 60 covers the brush card 56 and thus closes and partially covers the open end of the motor case 24. With reference to FIG. 7, since the end cap 60 does not completely cover the open end of the motor case 24, a portion of the windings 61 are exposed in a non end cap covered motor portion 63 to aid in cooling of the motor assembly 42. The end cap 60 includes a bushing assembly 62 that supports the other end of the shaft 46 for rotation.

FIG. 7 shows a fan, generally indicated at 64, mounted onto the shaft 46 (e.g., pressed on) of the motor assembly 42 of FIG. 6 to define a fan-motor assembly 65. The fan 64 includes a fan hub 66. A plurality of fan blades 68 extending from the hub 66 with tips of the blades 68 being joined by an outer ring 70. The hub 66 includes cooling fins 72 that aid cooling the motor assembly 42.

Figure 8:
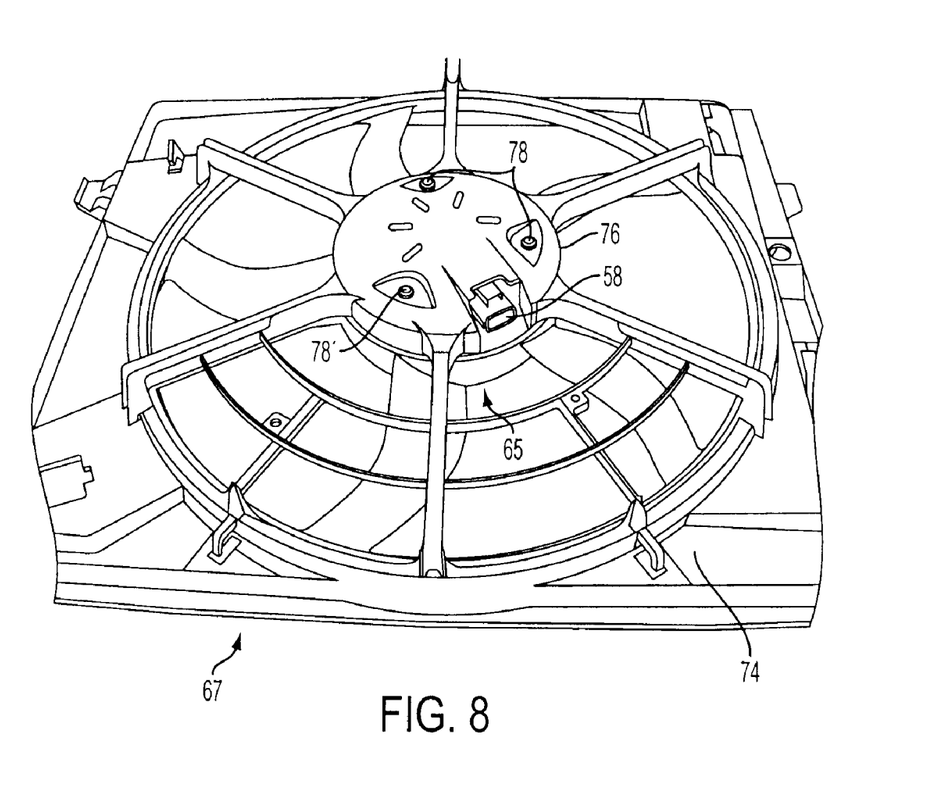
FIG. 8 shows the shroud side of the fan-motor assembly of FIG. 7 mounted to a shroud.
Figure 9:
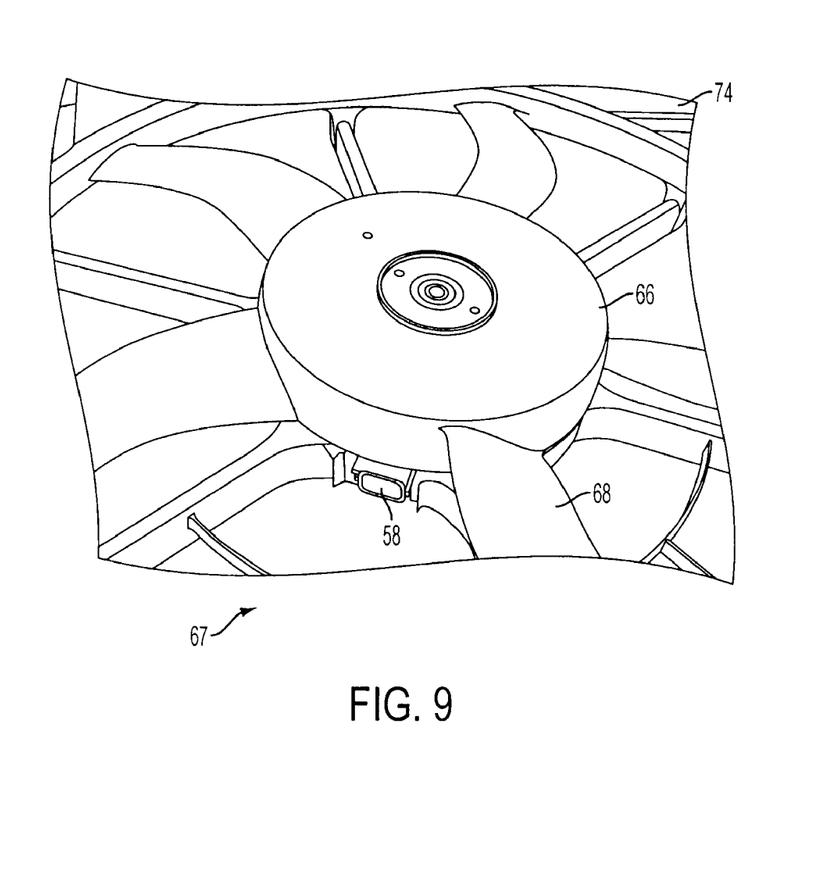
FIG. 9 shows the fan side of a portion of the assembly of FIG. 8.

FIG. 8 shows the fan-motor assembly 65 of FIG. 7 mounted onto a shroud 74 to define a cooling module, generally indicated at 67. In the figure, the motor assembly 42 is hidden (sandwiched between the fan hub 66 and a motor cover 76 that is part of the shroud 74. Fasteners, preferably in the form of thread-forming screws 78 secure the motor-fan assembly 65 to the shroud 74. More particularly, each screw 78 forms a thread in an associated hole 40 of a bracket 30 of the motor case 24 (FIG. 7). Rivets 78' or other fasteners can be used instead of the screws 78 to engage the brackets 30. FIG. 9 shows a portion of the fan side of the module 67.

With reference to FIGS. 8 and 9, the motor assembly 42 (only connector 58 seen in FIGS. 8 and 9) is packaged/sandwiched with respect to the shroud cover 76 and fan hub 66 such that the motor assembly 42 is barely visible. In a conventional motor configuration, the motor case and end cap are painted for esthetic/appearance purposes. Since the motor assembly 42 is barely visible, there is an opportunity to further reduce the system cost by choosing a more economical surface protection for motor case 24 and end cap 60 or even not applying any type of protection. Also, the back of the motor assembly 42 (end cap 60 and non end cap covered motor portion 63 of FIG. 7) is protected/shielded by the shroud motor cover 76 from heat and/or splashing liquids. Therefore, a smaller end cap 60 can be used, resulting in lower cost. More importantly, the end cap 60 is not used for motor mounting. Thus, thin material can be used to make the end cap 60, which also further reduces the overall cost of the product.

Figure 10:
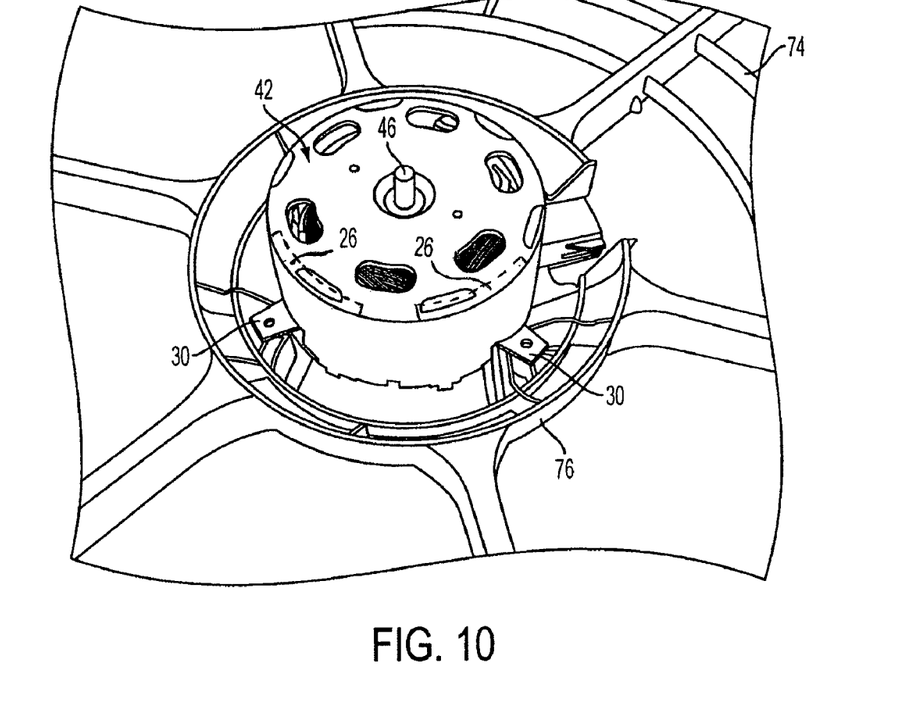
FIG. 10 shows the motor of FIG. 6 mounted to a shroud, with a fan not yet attached.

Instead of mounting the shroud 74 to the motor-fan assembly as in FIG. 8, FIG. 10 shows that the motor assembly 42 also can be mounted/fastened (the fasteners are not shown) to the shroud 74 first, then the fan 64 can be attached thereafter. However, a hole will be required in the middle of the motor cover 76 to support the shaft 46 at the motor cover side during a fan press-on operation. In this embodiment, a fan adapter (not shown) is insert-molded into the center part of the fan hub. However, the fan adapter also can be pressed on to the motor shaft 46 prior to fan attachment for other types of fan attachment configurations.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A method of mounting a motor assembly to a shroud, the method including:
    providing a motor assembly having a motor case of generally cylindrical shape having at least one open end, an end cap partially covers the open end, the motor case defines a central axis, the motor case includes a plurality of mounting brackets integral therewith at the open end, each mounting bracket having only a bottom portion connected with the case with cut-out portions in the motor case defining side portions of each bracket that are separated from the motor case,
    bending the mounting brackets about the bottom portion thereof with respect to the motor case so as to be generally transverse with respect to the central axis,
    providing a shroud having a motor cover, and
    mounting the motor case and thus the motor assembly to the shroud by engaging a fastener, associated with the motor cover, with each of the brackets such that the motor cover substantially covers the end cap and open end of the motor case.

2. The method of claim 1, wherein each bracket includes a hole and the fastener is a thread-forming screw, the method includes engaging a thread-forming screw with an associated hole.

3. The method of claim 1, wherein the motor assembly includes:
    an armature assembly disposed in the motor case for rotation with respect to the motor case, the armature assembly including a shaft that rotates with the armature assembly,
    a brush card assembly associated with the armature assembly, and
    the end cap is disposed over the brush card assembly and defines a non end cap covered motor portion,
    wherein the step of providing shroud and motor cover includes ensuring that the motor cover substantially covers the end cap and the non end cap covered motor portion.

4. The method of claim 3, wherein the shaft has an end extending from a second end of the motor case opposite the open end thereof, the method further includes coupling a fan to the end of the shaft, the fan having a hub constructed and arranged to substantially cover the second end of the motor case.

\* \* \* \* \*